United States Patent [19]

Kirschner et al.

[11] 4,026,555
[45] May 31, 1977

[54] TELEVISION DISPLAY CONTROL APPARATUS

[75] Inventors: Wallace Kirschner, Trumbull; Lawrence Martin Haskel, Danbury, both of Conn.

[73] Assignee: Alpex Computer Corporation, Danbury, Conn.

[22] Filed: Mar. 12, 1975

[21] Appl. No.: 557,484

[52] U.S. Cl. .................. 273/85 R; 178/DIG. 22;
273/102.2 R; 273/102.2 B; 273/DIG. 28;
340/172.5; 340/324 AD; 340/337
[51] Int. Cl.² ............... G06F 3/14; G06K 15/20
[58] Field of Search ........ 340/324 A, 324 AD, 337;
273/DIG. 28, 85 R, 102.2, 102.2 B; 178/DIG. 22

[56] References Cited
UNITED STATES PATENTS

| | | | |
|---|---|---|---|
| 3,422,419 | 1/1969 | Mathews et al. | 340/324 AD |
| 3,571,807 | 3/1971 | Candy et al. | 340/172.5 |
| 3,659,285 | 4/1972 | Baer et al. | 340/324 AD |
| 3,750,133 | 7/1973 | Helbig et al. | 340/324 AD |
| 3,793,483 | 2/1974 | Bushnell | 340/324 AD |
| 3,821,468 | 6/1974 | Busch | 178/6.8 |
| 3,836,902 | 9/1974 | Okuda et al. | 340/324 AD |
| 3,874,669 | 4/1975 | Ariano et al. | 340/324 A |
| 3,936,664 | 2/1976 | Sato | 340/324 AD |

*Primary Examiner*—David L. Trafton
*Attorney, Agent, or Firm*—Darby & Darby

[57] ABSTRACT

Keyboard-controlled apparatus for producing video signals for standard television receivers includes a random access memory having a multiplicity of storage positions each of which corresponds to a preselected discrete portion of the TV raster. Data stored in the random access memory is sequentially read from memory in synchronism with the scanning of the television receiver so that a desired video signal is generated at each discrete position of the cathode ray beam. Data is read into the random access memory at preselected storage positions depending upon a particular image to be displayed. The data writing process is under the control of a micro-processor which is programmed to cause the stored image data to be varied in accordance with the condition of the user-controlled keyboard.

17 Claims, 16 Drawing Figures

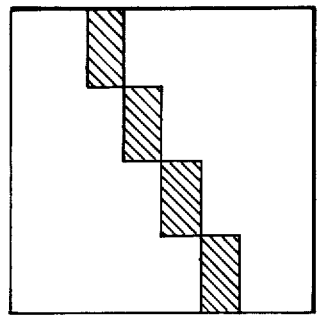
FIG. 5D 22.5°
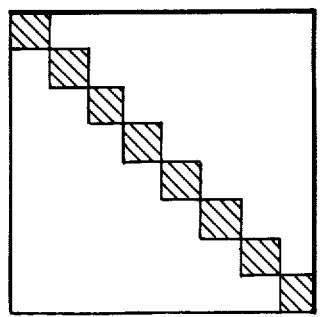
FIG. 5C 45°
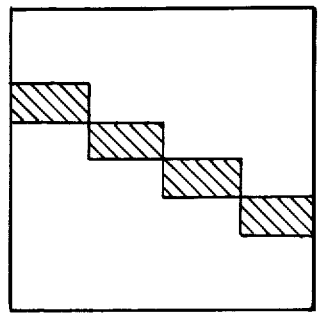
FIG. 5B 67.5°
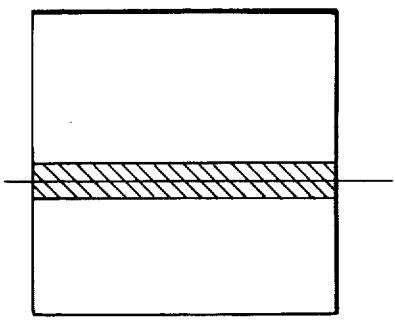
FIG. 5A 90°
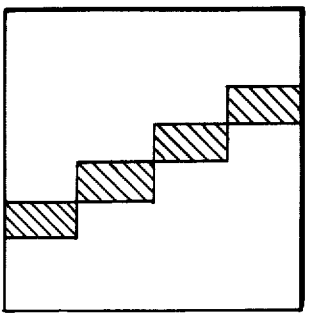
FIG. 5H −67.5°
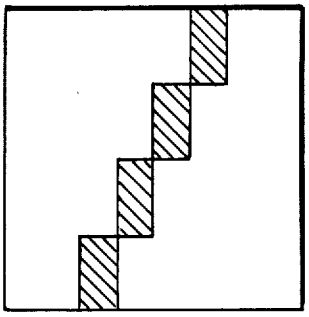
FIG. 5G −45°
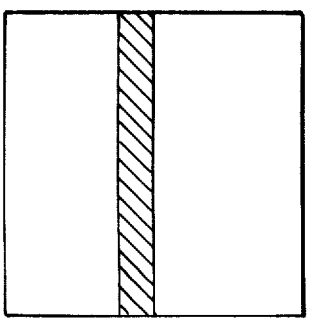
FIG. 5F −22.5°
FIG. 5E 0°

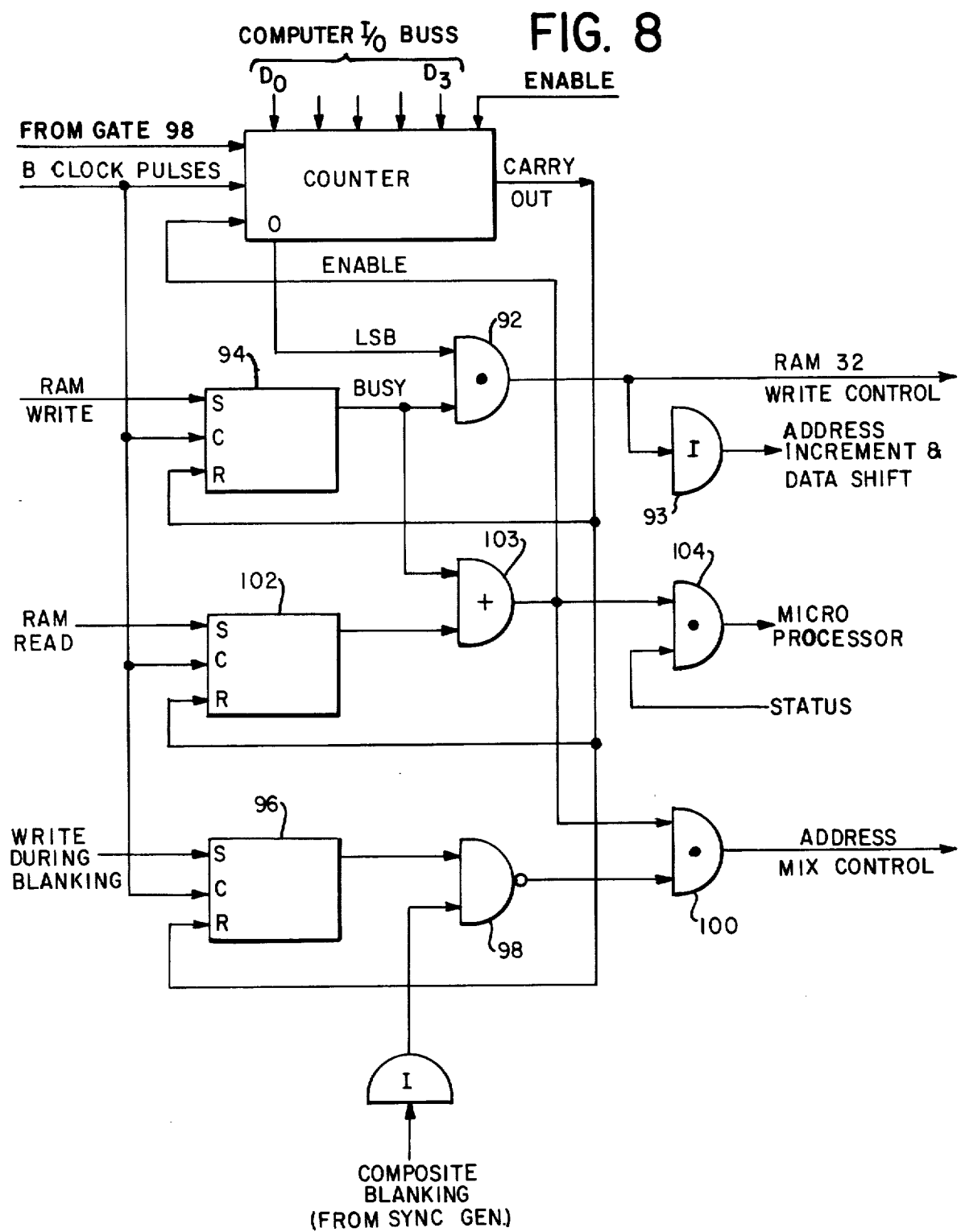

TELEVISION DISPLAY CONTROL APPARATUS

This invention relates to apparatus for controlling the video display of a standard television receiver. More particularly, the present invention concerns a device, adapted to be connected to the antenna terminals of a television receiver, which is capable of producing a predetermined display including various image symbols, the positions of which can be selectively manipulated by a user. Although not so limited, the invention is of particular utility as an adult and/or child entertainment device.

The system described in U.S. Pat. Nos. 3,659,284 and 3,659,285 can be used with a standard television receiver to play various types of games as described therein. That system includes electronic circuitry which generates video signals (representing the symbols to be displayed) at appropriate times during scanning of a standard receiver to create certain predetermined image symbols on the television screen. By controlling the time of occurrence of these video signals, the user can manipulate the positions of the various image symbols. Different games can be played by securing an overlay screen to the television receiver.

The present invention related to electronic apparatus for generating video signals for standard television receivers which is substantially different from and superior to systems represented, for example, by the above patents. Among other things, the invention provides the user with substantially greater control of the display and manipulation of the image symbols, thereby enhancing its value as an entertainment device. The invention can be used to play more games than is possible with known systems of this type, and it does not require overlay screens to establish boundaries or other constraints for different games. It is also more flexible in its capacity to accommodate individual skills, and can be used to play games substantially more challenging than those games available on known systems.

Furthermore, and of great significance, the present invention is not limited in its utility to an entertainment or game type device. The system can be used as a home intelligent terminal for generating or receiving, and displaying selected messages of any type. For example, and as explained below, the same basic system used to display and manipulate image symbols in a game can be made to function as a calculator using the television screen to display totals, subtotals, sums which are being held in memory, and other values.

Briefly, in accordance with the invention, a television raster is digitized into a multiplicty (for example, about 32,000) discrete dots or bars. A random access memory having at least a similar multiplicity of data storage positions maintains a digital representation of the data to be displayed on the television screen. Normally, data is read from the memory in synchronism with the scanning of the television screen, i.e. each storage position is read from memory as the cathode ray beam is scanning the corresponding bar of the raster. Display data is written into memory under the control of a programmed micro-processor which modifies the display data stored in the memory in accordance with the condition of the keys of a keyboard manually controlled by the user(s).

The micro-processor used to determine the display data can be operated to perform a wide variety of standard calculator functions. Accordingly, in addition the game control keyboards, an alpha-numeric keyboard may be provided so that the system can be used as a calculator with selected entries being held in the random access memory and, consequently, displayed on the television screen. Because of the size of the television screen, the display capacity is sufficient to enable the device to be used to display previous subtotals, numbers held in memory, or other desired values.

Figure 6:
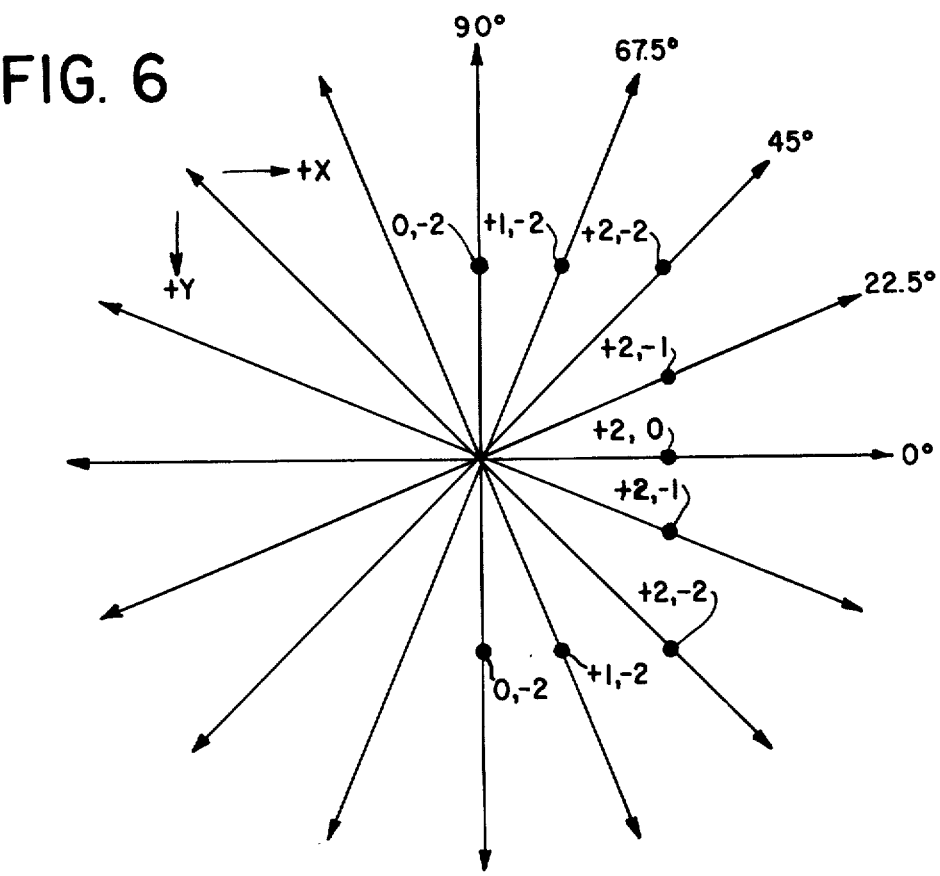
Figure 7:
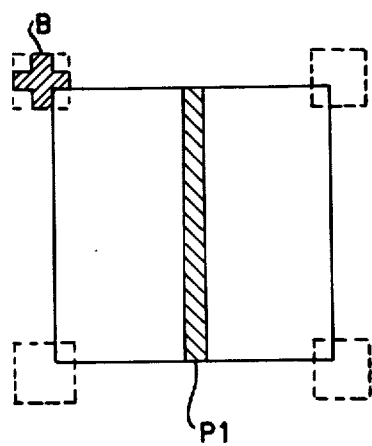

FIGS. 5A–5H diagrammatically represent data blocks corresponding to various rotational positions of certain image symbols;

FIG. 6 is an explanatory diagram describing how the direction of a continuously moving image symbol is determined;

FIG. 7 is an explanatory diagram; and

Figure 3:
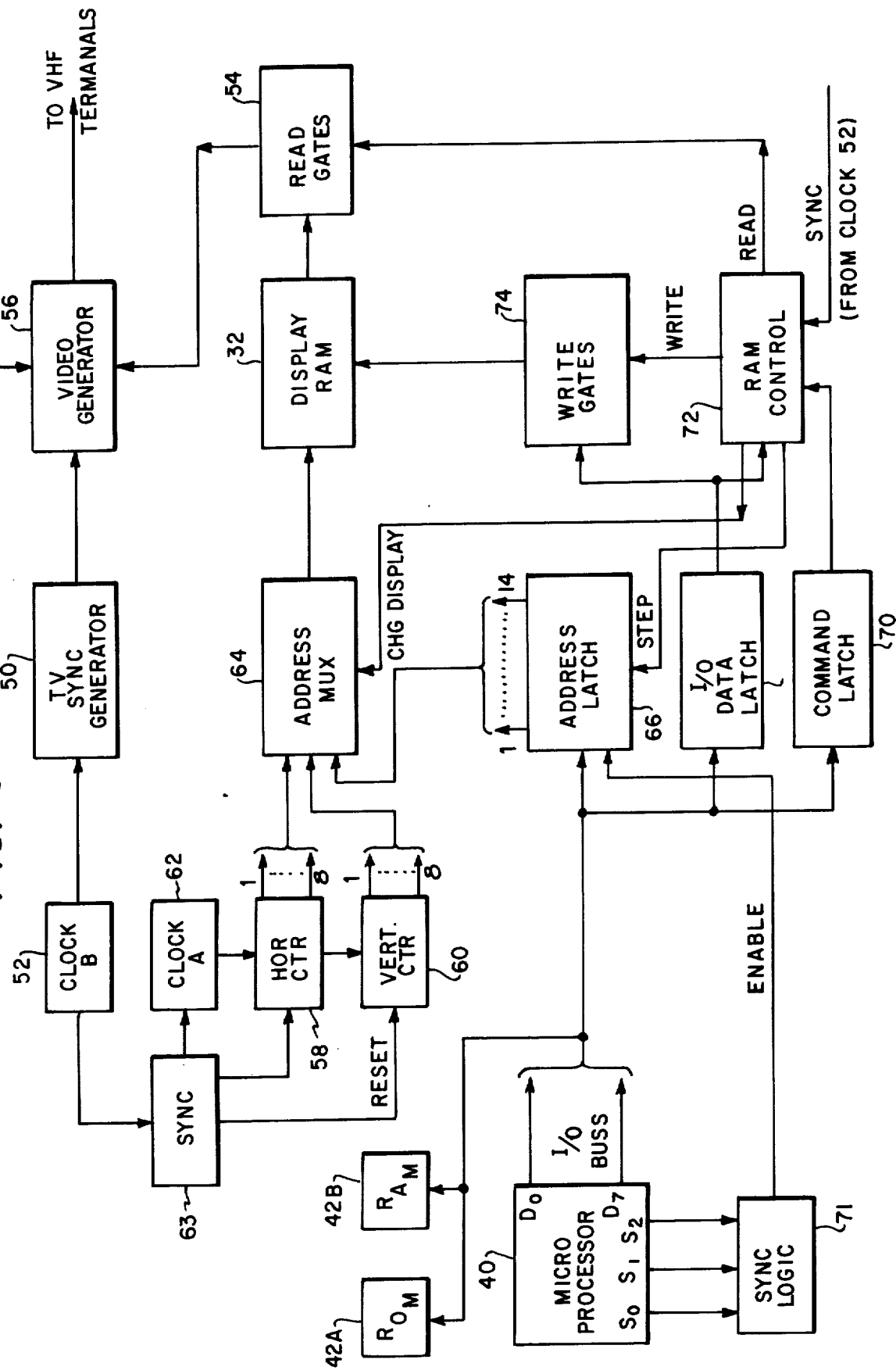
FIG. 3 is a more detailed block diagram of the invention.

FIG. 8 is a logic diagram of one of the control circuits shown in block form in FIG. 3.

In the following description, a particular example is presented for purposes of explanation only. The image symbols which appear on the television screen are referred to as "image devices". The image device which moves continuously until deflected by another image device is referred to as a ball whether the game is considered to be tennis or hockey, or whether the continuously movable image device is intended to represent a missile or the like. The image devices which intercept and deflect (or launch) a ball are referred to herein as "players" whether the image represented thereby corresponds to a human form or an instrument such as a paddle, bat or weapon. Similarly, the term "goalie" as used herein is not intended to be restrictive in terms of function but, as in the previous cases, represents one particular player image device displayed on a television screen.

Figure 1A:
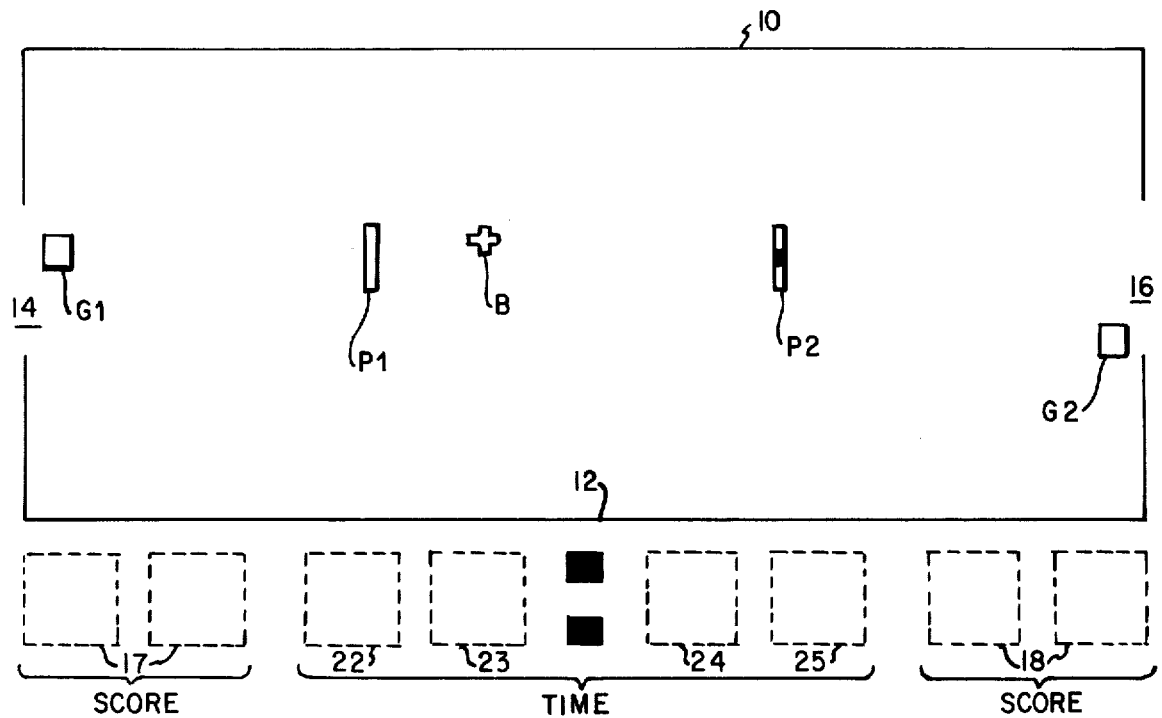
FIG. 1A illustrates a typical game display and the image symbols which would exist in accordance with a preferred embodiment if the system were used to play a hockey game.
Figure 1B:
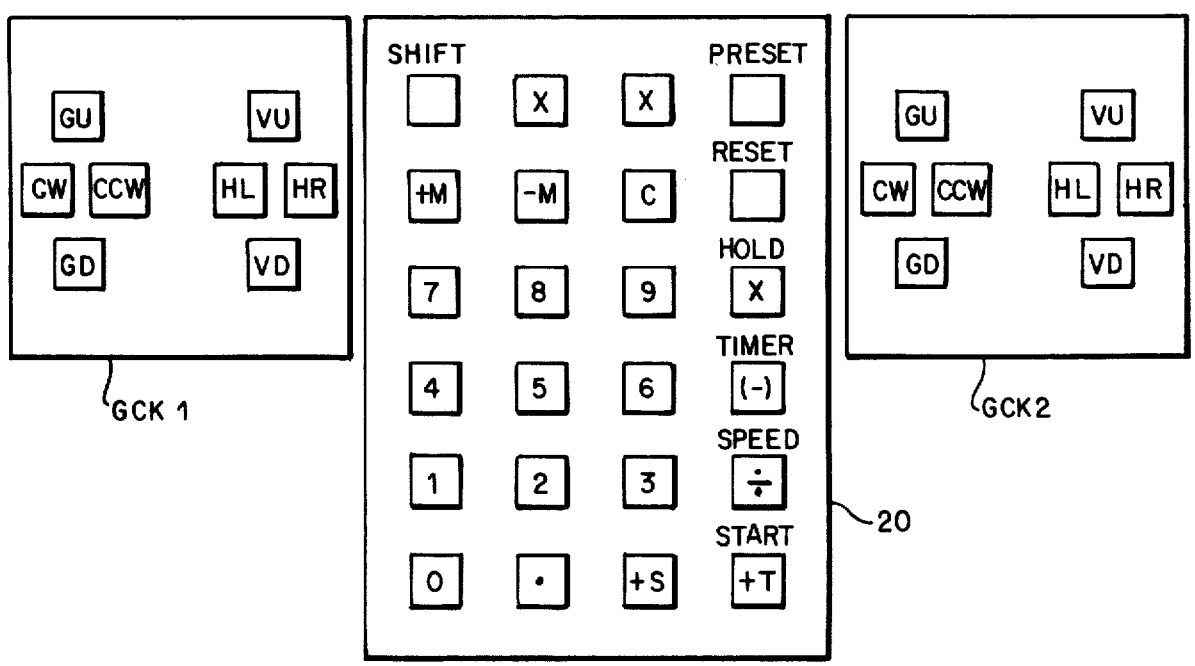
FIG. 1B illustrates the game control keyboards, by means of which the game is played, and a typical calculator keyboard including certain keys required to select and set up the parameters of a game.

FIG. 1A shows a typical display which will appear on the screen of the user's television receiver and FIG. 1B illustrates the keyboards by which the users play the game. In describing the invention, a hockey game is used for purposes of explanation since this game includes many of the image devices used in other games. Normally, the screen will be blank with the images illustrated in FIG. 1 appearing in white.

The boundary of the hockey rink is shown by the lines 10 and 12, the break between the boundaries representing goals 14 and 16. Each side has a player (P1 and P2) and a goalie (G1 and G2). The ball (puck) is shown as a cross and is represented by the letter B.

The ball B is set into motion when the game is started. It moves in a predetermined path until it strikes one of the players P1 or P2, one of the goalies G1 or G2, or the boundaries 10 or 12. When it strikes one of these image devices, it is deflected approximately at its angle of incidence (or some other angle) and continues its movement until it is intercepted by one of these image devices again. The users have the ability to manipulate the goalies and players so that the ball B can be intercepted and deflected toward the opposing player's goal. Each time the ball B strikes the goal 14 or 16 or a score is registered for the opposing player in the areas shown by the boxes 17 and 18.

Each user manipulates his goalie and player by means of a game control keyboard which are shown diagrammatically in FIG. 1B as GCK1 and GCK2, respectively. Each gas control keyboard includes eight push buttons arranged as shown and bearing the legends $V_U$, $V_B$, $H_L$, $H_R$, $G_U$, $G_D$, CW and CCW. These keys, when depressed, cause the following functions to occur for the associated image device.

| KEY | FUNCTION |
|---|---|
| $V_t$ | Player moves vertically upward. |
| $V_D$ | Player moves vertically downward. |
| $V_L$ | Player moves horizontally left. |
| $V_R$ | Player moves horizontally right. |
| CW | Player rotates clockwise. |
| CCW | Player rotates counterclockwise. |
| $G_t$ | Goalie moves upward. |
| $G_D$ | Goalie moves downard. |

Each keyboard, of course, controls only one player and one goalie. Each player is capable of moving in any direction on the screen and covering the entire area defined by the boundaries 10 and 12. Moveover, the user has the ability to rotate the player so as to change the angle of deflection of the ball B and thereby redirect its direction of movement. The goalies, which may be smaller in size than the players, can only move vertically in the illustrated embodiment.

In addition to the two game control keyboards GCK1 and GCK2, there is an alpha-numeric keyboard which includes twenty-four keys bearing identifying numerals and legends as shown in FIG. 1 The keyboard 20 is used in setting up the game and also for entering data into the micro-computer when the system is to be used in a calculator mode.

By way of introductory material and prior to explaining the operation of the invention, a brief description is provided of the way in which the invention is used to set up the TV receiver for the hockey game. It may be assumed that the system has the capability of controlling three games (e.g. hockey, tennis, and a moving target game) or being used as calculator.

After the device has been connected to the VHF antenna terminals of the television receiver, it is turned on and the RESET key on keyboard 20 depressed to clear the TV display. As soon as the display has been cleared, a symbol such as "G?" appears on the screen which asks the user which mode of operation is to be used. If the user wishes to play the hockey game, key "1" (for example) is depressed. This removes the symbol "G?" and sets up the hockey boundaries, the players P1,P2, goalies G1, G2 and ball B essentially as shown in FIG. 1A.

As the same time the boundaries are set up, another symbol such as "S?" appears reminding the user to fix the game constraints (if desired) such as speed to movement, time of game, and boundary size. To adjust the speed factor, when the symbol "S?" appears, the user presses the key marked SPEED causing an "M?" to appear and then one of the keys 0–9 (for example) will provide ten increments of speed for the ball, players, and goalies. This speed factor enables the degree of difficulty to be controlled depending on player skill and/or the size of the television screen.

After the speed factor has been selected (the "S?" is again displayed), the users can select the time of the game by pressing the TIMER key causing a "T?" to appear the then the digit keys corresponding to the desired time in minutes may be activated. For example, depressing the digits "1" and "2" sequentially sets up the display "12:00" on the television screen in areas represented by the boxes 22, 23, 24 and 25.

After the time has been entered the symbol "S?" appears at the top of the display asking whether the users are prepared to start. If they wish for the game to commence, the START key is depressed. This immediately passes control of the players and goalies to the respective users by means of the game control keyboards GCK1 and GCK2 while at the same time the time displayed in the boxes 22–25 starts to count down in one second increments.

As mentioned above, the game is played by manuipulating the players and the goalies with the objective of deflecting the ball B into the opponent's goal. The ball B continues to move until a goal has been scored, the ball appearing to bounce off the players, goalies and boundaries as it moves on the screen. The time decrementing automatically stops when a goal is scored. The action may be similarly stopped by pressing the HOLD button.

Figure 2:
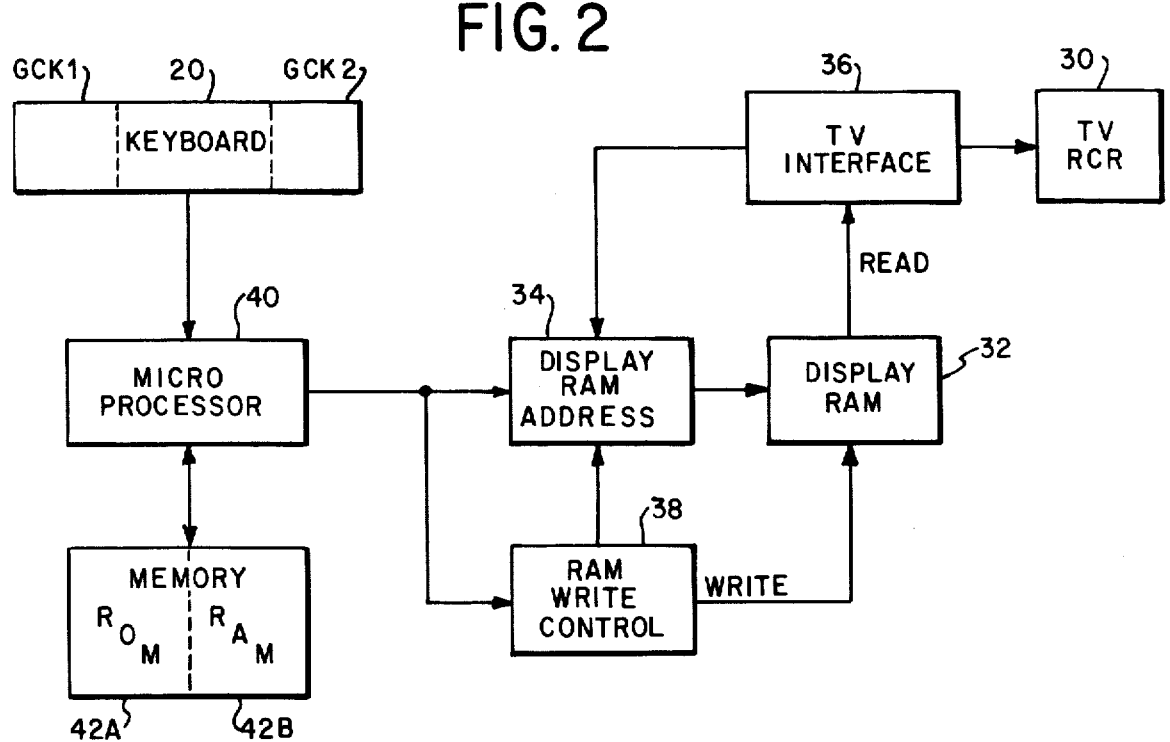
FIG. 2 is a general block diagram of the invention.

FIG. 2 is a block diagram showing in general diagrammatic terms the manner in which the invention operates.

For the invention to be used with standard television receivers, it must produce standard horizontal sync retrace and blanking pulses and vertical sync retrace and blanking pulses with the video information interspersed in the same way as if the signal had been generated by a remote television transmitter. In the United States, a television raster comprises 525 horizontal lines repeated at 30Hz (actually, 262.5 lines interlaced odd/even and repeated at a 60Hz rate). Each horizontal line takes 62.5 microseconds to scan from left to right and retrace to start the next line. At the conclusion of each horizontal line, a horizontal retrace and blanking pulse is transmitted to the receiver to synchronize the set for the next line and the sequence is repeated. At the end of 262.5 lines, the beam is at the bottom of the raster and a vertical retrace and blanking pulse is transmitted returning the beam to the top of the raster. The active display area as the beam travels horizontally from left to right exists for approximately 53 microseconds.

In accordance with the invention, the standard television raster is "digitized" by subdividing each of these horizontal scanning periods into a numger of discrete periods or, stated in other words, by subdividing each horizontal line into a number of discrete bars. As an example, in the preferred embodiment of the invention, each horizontal line is divided into approximately 132 time elements each of which measures 400 nanoseconds. At each of these 400 nanosecond time intervals, during the scanning of the television receiver, the invention provides a binary type signal modulating an RF carrier instructing the receiver to illuminate or not illuminate. This, in effect, creates 132 bars (or dots) per horizontal line.

Obviously, the number of bars used is not a material feature of this invention. In practice, the same bars are re-scanned during the odd and even fields of a single raster to provide a maximum of 34,650 discrete areas or bars per raster.

Referring now to FIG. 2, the television receiver is shown at 30. In accordance with the invention, a random access memory (hereinafter referred to as a RAM 32 includes a multiplicity of discrete storage positions which correspond to each of the "bars" of the TV rasters as defined above. Thus, if the number f bars in a raster is 34,650 there will also be at least 34,650 discrete storage positions in the display RAM 32. In practice, since the entire lines are not actually displayed, a storage capacity of 32,000 characters is sufficient.

As explained below, a binary "1" or "0" stored in each of the memory positions of RAM 32 with these bits correlating exactly to the desired image to be displayed on the television screen. In this sense, RAM 32 may be regarded as a digital representation of the actual image to be displayed.

Random access memories suitable for use as display RAM 32 are commerically available from various sources. Successful experiments have been conducted using four 4Kx1 RAMS (Intel 2107 series). Data can be read from or written into such RAMS, one bit at a time, at very high speed at any selected address and the invention also includes a display RAM address circuit 34 which has the capability of selectively addressing each individual storage position in RAM 32 to permit data to be read from RAM 32 for display purposes or to be written into RAM 32 to change the existing display.

A TV interface circuit 36 described in further detail below, causes the RAM address circuit 34 to sequentially scan each of the storage positions in the RAM 32 and provides the required horizontal and vertical sync pulses for receiver 30. Thus, the TV interfacing circuits 36 translate the multiplicty of data bits in RAM 32 into a composite video signal which is compatible with the television receiver 30, thus enabling the receiver 30 to display the "image" stored in the RAM.

A RAM write-control circuit 38 enables data to be written into the RAM to change the display on the television screen. As diagrammatically shown, the write-control circuit 38 can seize control of the RAM addressing circuits 34 whenever it is desired to update the image data stored in RAM 32.

The "intelligence" of the system is provided by a micro-processor 40 which operates in conjunction with a memory comprising a read-only memory (ROM) 42A and a RAM 42B. Microprocessor 40 continuously polls the game control keyboards GCK1 and GCK2 and the calculator keyboard 20 to determine whether it is necessary to move the goalies, playes or ball (determined by user depression of one of the keys of GCK1 or GCK2) or to modify the display in some respect because of the depression of one of the keys of the calculator keyboard 20. The operation of the micro-processor 40 is under the control of a program stored in the ROM 42A. When any key of the keyboard has been depressed, requiring a change in an existing image device position, micro-processor 40 in conjunction with a stored program determines the new image to be displayed and then, by means of the RAM write-control circuits 38 and the RAM address circuits 34, erases the old "image" in display RAM 32 and substitutes a new image at the proper storage locations.

There are currently a number of commercially available devices which can be used as micro-processor 40. Satisfactory experimental results have been achieved using a micro-processor sold by Intel Corporation under the manufacturer's identifying number 8008-1. The micro-processor used must have the capability of revising the display data in RAM 32 fast enough to maintain what appears to the human eye as a substantially continuous display. For example, the Intel 8008 micro-processor has a cycle time of 12.5 microseconds. This is the time required to receive an instruction and to start to execute it. In the illustrated embodiment, micro-processor 40 is programmed to poll the ball position, the two game control keyboards, the calculator keyboard and a timer (not yet described). Assuming that a hockey game is being played (which requires a relatively long polling cycle because of the two goalies), approximately 100 milliseconds are required to update the stored display data in RAM 32. Since a single television frame lasts 30 milliseconds, this means that the display would change about every three to four frames. This is fast enough for the human eye to perceive the changes as a continuous movement. Higher speeds may be achieved with an interrupt-driven program (or a faster micro-processor) wherein only those image devices which require service are polled.

FIG. 3 is a more detailed block diagram of the overall system. The horizontal and vertical sync pulses are generated by a TV sync generator 50 driven by a master clock 52. Clock 52 provides a source of stable timing pulses which are divided by sync generator 50 to generate the standard EIA timing pulses needed for television broadcasting, namely, horizontal sync and vertical sync pulses, composite sync, composite blanking, (color burst sync), and field indexing. Devices of this type are commercially available and, for example, National Semiconductors' "TV syn generator" MM5320 has been used successfully.

The video information is derived through read gates 54 from the display RAM 32 and the appropriate video signal is generated by a video generator 56 responsive to the outputs of the TV sync generator 50 and the read gates 54. Thus, in effect, the input to the video generator 56 includes all required TV timing pulses and a binary signal representing the desired condition (blank or unblank) of the bar being scanned by the TV beam. The video generator 56 sums these signals to yield a composite signal which is then modulated at the proper carrier frequency for a selected channel. This should be an unused channel in the area in which the device is being used.

Proper scanning of the display RAM 32 requires that each bit be read exactly when the beam of the TV tube is traversing the bar of the screen corresponding to that bit. For this purpose, scanning of the RAM 32 is controlled by a horizontal counter 58 and a vertical counter 60 both of which are driven by a master clock 62 which is synchronized with the clock 52. If, for example, each horizontal line is divided into 132 time elements or bars, then counter 58 counts from 1 to 132 in equal increments as the beam moves across a horizontal line. The carry-over from counter 58 is coupled to the vertical counter 60 which, in a similar way, produces a binary output on its eight output lines representing which of the 262.5 horizontal lines is being scanned. Hence, at any given instant in time, the binary numbers appearing at the outputs of counters 58 and 60 represent the horizontal and vertical addresses of the discrete bar being scanned at that instant. Herein, reference to an "address" is intended to mean a unique identifier for a bar or image device relative to the TV screen, and thus, implicitly, the location of the corresponding data storage position or positions in RAM 32.

An address multiplexer 64 receives the parallel outputs from the counters 58 and 60 and, in a known fashion, produces a sixteen-bit binary address on its output which will cause the data at one of the storage positions within the RAM 32 to be read from memory. Address multiplexer 64 is also a standard commercially available device designed for use with RAMS such as display RAM 32 and a sixteen-bit binary number is capable of addressing 64,000 discrete bit positions within RAM 32.

Thus, as the horizontal counter 58 and the vertical counter 60 are sequentially stepped by the clock 62, data is sequentially read from the display RAM 32 with each bit being read at a point in time when the beam of the television receiver is scanning the corresponding bar on the TV screen. In this fashion, the display on the television receiver represents precisely the condition (true or false) of the individual storage elements of RAM 32.

A sync logic circuit 63 responsive to the timing pulses from clock 52 drives clock 62 in synchronism with these basic timing pulses so that the outputs of counters 58 and 60 will correlate with the timing pulses produced by the TV sync generator 50. The frequency of clock 52 (2.045 MH$_z$) is fixed by the sync generator 50. At that frequency, its timing pulses can be used to drive counter 58 (in which case clock 62 is unnecessary). However, a higher frequency clock 62 will enable greater resolution of the displayed images if this is desired. The sync logic circuit 63 also generates horizontal and vertical reset pulses for counters 58 and 60, respectively, during horizontal and vertical beam retracing. Hence, counter 58 is properly reset at the beginning of each line and vertical counter 60 is reset at the start of each field.

As mentioned above in connection with FIG. 2, the programmed micro-processor 40 causes the video display to be changed by appropriately modifying the data stored in the display RAM 32. In FIG. 3, the micro-processor 40 is shown as including eight data output lines $D_0$-$D_7$ and three synchronizing lines $S_0$, $S_1$ and $S_2$. The micro-processor 40 includes eight input/output data lines (also known as an I/O data bus) which are coupled to the ROM 42A, the RAM 42B, and three latches 66, 68 and 70. A logic circuit 71 responsive to the sync signals $S_0$, $S_1$ and $S_2$ produces appropriate timing and command signals which represent the nature of the 8-bit byte appearing at any given instant on the I/O data bus. This circuitry also operates in a conventional way depending on the particular micro-processor employed and, for example, will indicate to the peripheral equipment whether a particular byte represents an address, an instruction, or the execution of an instruction.

By way of further example, assume that a user has depressed a key on the game control keyboard which should cause the player P1 to move on the display vertically upwardly. This will require that the data stored in RAM display 32 be modified by "erasing" player P1's current position (by reading 0's into the corresponding bit storage locations) and moving the player P1 to a new storage position by writing 1's into the storage positions corresponding to this new location. As the micro-processor 40 polls the game control keyboard, depression of the selected key will cause the micro-processor, under the control of the program stored within the ROM 42A, to access a RAM control circuit 72 by means of the command latch 70 in order to change the display stored within RAM 32. When this occurs, the RAM control circuit 72 switches the input to the address multiplexer 64 from counters 58 and 60 to the address latch 66 in which is stored the starting address of the portion of the display to be modified. At the same time, the new data to be stored is retained within the I/O data latch 68 and is coupled to write gates 74 which are enabled by a write signal from the RAM control circuit 72. Hence, the display RAM 32 is switched from a read cycle to a write cycle as the new display information now stored within the I/O data latch 68 is transferred into the proper location within display RAM 32 under the control of the address latch 66. As each data bit is written into RAM 32, the RAM control circuit 72 shifts the data in data latch 68 by one and steps the address latch 66 by one so that the next data bit will be written into the proper storage location. As explained below with reference to FIG. 8, RAM control circuit 72 receives inputs from data latch 68 and command latch 70 telling it how many bits are to be written for each instruction.

Since the micro-processor seizes control of the display RAM 32 whenever it is desired to write data into the RAM, a barely noticeable flicker of the television screen may occur during the write cyclp. If this flicker is troublesome, it is contemplated, as explained below, that the write cycle occur only during horizontal and vertical retraces in which case the visual display (during reading of the display RAM 32) would not bp affected.

As explained in further detail below, the micro-processor 40 functions under the control of "software" (i.e. a computer-type program) which is stored within the ROM 42A. Except as more specifically indicated below, the actual manner in which the micro-processor 40 is programmed does not constitute a specific feature of this invention although the fact that the device is capable of being programmed in different ways provides significant benefits. In the preferred embodiment, the micro-processor 42 polls or samples each element of the system which may cause any modification of an existing display. Where the invention is being used to play a game, such elements include the ball B, the two game control keyboards GCK1 and GCK2, the calculator keyboard 20, and the internal timer (which causes a timer display change every second during a selected game).

Figure 4:
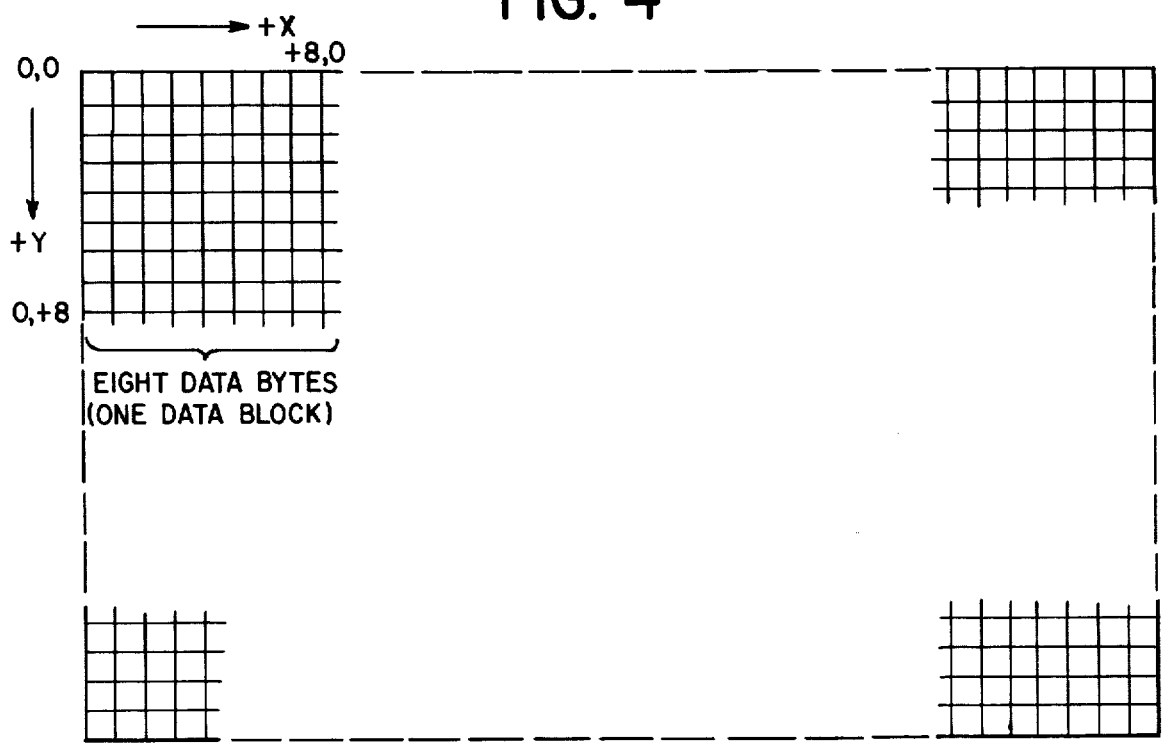
FIG. 4 is an explanatory diagram.

So that micro-processor 4 can modify the display depending on the relative positions of the players P1 and P2, goalies G1 and G2, and the ball B, the system maintains a record of the instantaneous positions of each of these movable image devices. In the preferred embodiment, the display is modified by writing in display RAM 32 eight (or less) vertically stacked eight-bit (or less) data bytes (hereinafter sometimes referred to as a data block). The X and Y coordinates of the television screen are considered (arbitrarily) to increase positively from left to right and in a downward direction, respectively, as represented in FIG. 4 which shows diagrammatically the storage position of the "upper left-hand corner" of the RAM 32. The address of any selected data block is considered to be the horizontal and vertical address of the upper left-hand bit of the data block. In FIG. 4, the address of the data block shown would therefore be (0,0).

As indicated previously, each of the players P1 and P2 is capable of rotational movement in clockwise and counterclockwise directions. In accordance with the invention, this capability of rotational movement is provided by storing within the ROM 42A the possible rotational positions of each of the players. These angular or rotational positions are shown in FIGS. 5A-5H each of which is a diagrammatic representation of one data block stored within ROM 42A. The dark bars represent a binary "one" and the light bars represent a binary "zero". The rotational code corresponding to a vertical player is shown in FIG. 5A. Each of the successive representations in FIGS. 5B through 5H represents the player rotated by an additional 22.5° with the angles corresponding to the illustrated data blocks being indicated above the drawings. FIGS. 5A to 5H show essentially the player image as it appears to the viewer on the screen. Thus, in this particular example, using eight separate rotational codes, it is possible to incrementally rotate each of the players P1 and P2 22.5° in either direction. The angular resolution and the number of rotational positions is a function of the number of bar per raster. The preferred rotational increments are merely preferred for the example herein described.

When a game is to be played, the micro-processor 40 loads into RAM 42B the following information for each player (as the game display is set up):

Current X address
Current Y address
Rotational code (a two-digit code indicating which of FIGS. 5A-5H represents the player configuration)

For the goalies, the current X address (which remains constant) and the current Y address are loaded into RAM 42B. The word "current" in this context refers to the address of the image device (i.e. the corresponding data block) then being displayed.

In addition to the players and the goalies, the computer must also hold in memory the current X and Y address of the ball. In the case of the ball, there are additional factors which must be stored. These factors are referred to herein as the X and Y ball increments.

It is preferred that the ball remain in motion on the display once a game has been started. The ball should appear to be deflected by the boundaries of the game as set up on the screen and by each of the individual players and goalies if they should be "struck" by the ball. Since the display has been digitized by assigning discrete bars to each of the screen locations, the ball must be moved in increments determined by the size of these bars. Arbitrarily, it may be assumed that the ball is to move horizontally or vertically two bars at a time (i.e. if the ball is moving horizontally, it will jump two bars during each polling cycle). If the polling cycles require, for example, between 100 and 250 milliseconds, the human eye will integrate the movement of the ball so that it will appear to be substantially continuous.

Referring to FIG. 6, if the ball is to appear to be moving from left to right along the X axis the X and Y increments of movement are +2 and 0 respectively. If the ball is to move at an angle of +22.5° then the X and Y increments are +2 and −1 respectively. Similarly, X and Y increments of +2 and −2 will cause the ball to appear to move at 45°, and so forth.

Accordingly, by storing these X and Y increments of ball movements, the micro-processor 40 maintains a record of the current direction in which the ball B is moving as well as the current address of the ball.

The actual programming of the micro-processor can, for the most part, be accomplished by standard programming techniques, although the techniques which enable the players P1 and P2 to be rotated in either direction, and the angle of deflection of the ball to be modified accordingly, are subsidiary features of the invention. The following discussion presents sequentially the various microcomputer functions as they occur when it is desired to use the invention to play a hockey game. Many of the individual steps in these various functions are omitted from the following description in the belief that a person of ordinary skill in the art would have no difficulty in providing the additional programming required to yield the desired result.

RESET Routine ("Reset" key depressed)

a. Clear TV screen by writing zeroes into all memory positions of RAM 32.
b. Display "G?" on TV screen. User now has option to select Calculator, Hockey, Tennis, or Moving Target game.
c. Call INITIALIZING Routine INITIALIZING Routine (Assume "Hockey" key depressed)

a. Set "masks" (which keys are to be used and which devices are to be polled). Store "masks" in RAM 42B.
b. Display game borders (e.g. by writing in RAM 32 a series of horizontal and vertical symbols stored in ROM 42A) at predetermined addresses (also stored in ROM 42A).
c. Display players P1 and P2 at initial positions.
d. Display goalies G1 and G2 at initial positions.
e. Display ball B at initial position.
f. Call PARAMETER Subroutine (to start game).
g. Display scores (0's to start).
h. Jump to POLLING Routine.

The symbols for the players, goalies and ball are stored within the ROM 42A as data blocks. During the initializing subroutine, the micro-computer pulls these symbols from ROM 42A and transfers them sequentially to display RAM 32 at respective addresses corresponding to a desired initial position. For example, the initial position for these various devices may be that shown in FIG. 1 in solid lines. This portion of the initializing subroutine will usually differ for each game and, obviously, is dependent upon the "borders" to be displayed, the number of players to be used and whether there will also be goalies. The following portion of the initializing subroutine is common to all three games.

PARAMETER Subroutine

A. Display "S?".
B. Is START key depressed?
i. Yes — return to INITIALIZING Routine.
ii. No —
 a. Is TIME key depressed?
  i. yes — look for 2 numeric digits.
  ii. No — check for SPEED key.
 b. Is SPEED key depressed?
  i. yes — get SPEED factor.

Thus, after the initializing routine has been completed, the entire display appears on the TV screen with the selected time being decremented in one-second intervals and the players and goalies ready to move under the control of the game control keyboards GCK1 and GCK2.

The polling routine uses a number of separate subroutines for the individual devices which are to be polled.

The polling mask used in the polling routine comprises a single byte of information having bit positions, in the preferred embodiment, corresponding to player P1, player P2, the goalies, the moving target game, the ball, and the timer. As indicated above, this mask was set during the initializing routine and stored in the RAM 42B. It is this polling mask which determines the devices to be polled, there being no bit corresponding to the alpha-numeric keyboard since the keyboard is always polled. In the case of the hockey game, all devices except the moving target are polled. The polling routine is as follows.

POLLING Routine

A. Load polling mask (transfer mask byte from RAM 42B to micro-processor 40).
B. Call Player P1 subroutine.
C. Call Player P2 subroutine.
D. Call Goalie subroutine.
E. (Call moving target subroutine — not used in hockey example).
F. Call Ball subroutine.
G. (Call Calculator subroutine — not used in hockey example).
H. Get SPEED factor (from RAM 42B).
I. Delay polling cycle depending on speed factor.

The subroutines for the two players P1 and P2 are the same. For purposes of simplicity, only the player P1 subroutine and the ball subroutine are set forth below. As explained above, reference to an address refers to the address of a data block. "Current address" identifies the position of an image device (i.e. the data block containing that image) being displayed on the TV screen.

For each of the game control keyboards, an 8-bit byte of data information is generated during a polling cycle indicating the condition of the various game control keys. The presence of a binary "1" in any position of this game control status byte may represent the following commands:

| BIT POSITION | COMMAND |
|---|---|
| 0 | Player right - increment horizontal address by 2. |
| 1 | Player left - decrement horizontal address by 2. |
| 2 | Player down - increment vertical address by 2. |
| 3 | Player up - decrement vertical address by 2. |
| 4 | Rotate clockwise - increment player rotational code by 1. |
| 5 | Player counterclockwise - decrement player rotation code by 1. |
| 6 | Goalie down - increment goalie vertical address by 2. |
| 7 | Goalie up - decrement goalie vertical address by 2. |

PLAYER P1 Subroutine

A. Get GCK1 status (as explained above).
B. Load P1 current horizontal and vertical address (i.e. transfer address from RAM 42B to a micro-processor register).
C. Compute new P1 X, Y address (if necessary) an; hold in micro-processor.
D. Check boundary limits.
E. Load P1 current rotational code (i.e. transfer code from RAM 42B to a micro-processor register).
F. Compute new P1 rotational code (if necessary) per Table I and hold in micro-processor.
G. Display player P1 at new X, Y address with new angular position corresponding to new rotational code.

The display of player P1 (and the other dynamic or movable image devices) requires the erasing of the current P1 image on the TV screen and the storage of the new image device. Additionally, the current XY addresses and rotational codes in RAM 42B must be updated to correspond to the new address and rotational code. The current address data is not erased prior to display so that the micro-computer will be able to update the image stored in RAM 32 by writing 0's at the current address. This display function and the display functions for all of the items to be displayed whether static (i.e. stationary) or dynamic (movable) are under the control of a display subroutine as described below following the ball subroutine.

BALL Subroutine

A. Load current horizontal and vertical address of ball B($H_B$ and $V_B$).
B. Load current horizontal and vertical ball increments ($\Delta H_V$ and $\Delta V_B$).
C. Compute new ball address ($H_N$ and $V_N$) and new ball increments and hold in micro-processor.
  i. $H_N = H_B + \Delta H_B$
  ii. $V_N = V_B + \Delta V_B$
D. Call BALL DEFLECTION Subroutine.
E. Check Boundary limits.
F. Display ball position (New ball position is in RAM 42B and not displayed until next polling cycle).

If the ball is not to be deflected by either a player or goalie or boundary, the ball will continue to move in the direction in which it is currently moving as represented by the X and Y increments. However, if the ball is to appear to be deflected by any of the players or goalies, the micro-processor must predict this occurrence and cause a change of the ball increments so that it will appear to be deflected from whichever image device it "strikes" at some preselected angle. The ball deflection subroutine which is called after the new ball address has been computed permits the ball position to be compared to the position of the players P1 and P2 and the goalies G1 and G2. In addition, the ball deflection subroutine compares the ball position with the two goals and causes the appropriate score to be incremented by one when the ball is within the confines of either goal.

After the ball deflection subroutine, the micro-computer returns to the ball subroutine and compares the ball position with the boundaries. This can be done simply since the "addresses" of the boundaries are fixed horizontal (or vertical) values. Hence, when either the horizontal or vertical address of a ball is equal to a horizontal or vertical boundary limit, the image of the ball can be deflected by simply complementing the horizontal (X) or vertical (Y) ball increment. These new increments are then returned to the RAM 42B in the form of the current ball rotational codes as explained previously.

By way of example, if the ball increments are X = +2 and Y = 31 1 (corresponding, for example, to a direction of 22.5°), if the Y (vertical) address of the ball equals the Y value of the upper horizontal boundary, the ball increments are changed to X = +2 and Y = +1 which causes the ball to appear to have been deflected at an angle of −22.5° from the upper horizontal boundary. Had the ball "struck" a vertical boundary, the X increment would have been complemented.

As indicated above, after the boundary limits have been checked, the new ball position is displayed.

During the ball deflection subroutine, it is necessary to check the ball against the positions (addresses) of the two players, the two goalies and the two goals. At all times, the current positions of the players and goalies are stored within RAM 42B. The addresses of the two goals are stored within the ROM 42A. The following is a flow diagram for the ball deflection subroutine to check the ball position against the position of the first player. Essentially the same procedures are followed in the case of the player P2 and the two goalies. Basically, the program also applies in the case of the two goals, although when a goal is scored it is necessary to revise the score and to stop the ball movement and the clock.

BALL DEFLECTION Subroutine

A. Compare Current P1 and intended New Ball positions (does ball data block overlay new P1 data block).
  i. If no, return to Step A and check next image device.
  ii. If yes, load P1 current angular position code (from RAM 42B to micro-computer).
  iii. Determine new horizontal and vertical Ball increments.
  iv. Store new Ball increments in RAM 42B.
  v. Return to BALL subroutine.

To determine the existence of a need to cause a ball deflection movement, the blocks of data representing the player P1 and the ball are compared (rather than merely comparing their addresses). For example, if FIG. 7 there is shown a data block representing player P1 (regardless of the angular position of the player). The ball B which is represented by a three-by-three data block will overlay the data block of the player in any of the four positions shown in FIG. 7 or in any intermediate position. Knowing the X and Y addresses of both the player and ball data blocks, the limits of this overlay condition can be computed as a function of the respective addresses to determine whether ball deflection is required.

The determination of the new horizontal and vertical ball increments can be done in a number of ways. In the preferred embodiment, the micro-computer determines the new ball increments in accordance with the angular position of the player pursuant to a predetermined increment look-up table. An example of an increment look-up table suitable for this purpose is contained below assuming ball movement from right to left. Reference to FIG. 6, previously described, shows the reference angles for the player angular position and also indicates the apparent direction of movement of the ball for the stated increments.

| INCREMENT LOOK-UP TABLE | | | |
|---|---|---|---|
| Player Angular Position | New Ball Increments X | Y | Ball Deflection Angle |
| 90° | +2 | 0 | 0° |
| 67.5° | +2 | +1 | −22.5° |
| 45° | +2 | +2 | −45° |
| 22.5° | +1 | +2 | −67.5° |
| 0° | 0 | ±2 | ±90° |
| −22.5° | +1 | −2 | +67.5° |
| −45° | +2 | −2 | +45° |
| −67.5° | +2 | −1 | +2.5° |

If the ball is moving from left to right, then the indicated increments in the above table are complemented to determine the new ball increments. The sign of the current X increment indicates whether the ball is moving from right to left or from left to right, a positive sign indicating left to right movement.

It may be desirable for the first increment of ball movement upon deflection to be higher than the normal increment. This provides a pleasing visual effect on the TV screen and will also aid in moving the ball out of the "field of the player, i.e. to ensure that the data block of the ball cannot overlay the data block of a player after the first increment deflection step. This may be helpful in the preferred embodiment where actual coincidence of ball and player is not recognized but, instead, is predicted with ball deflection occurring on the next polling cycle. Thus, unlike the other image devices, in the case of the ball the "current" increment information stored in the RAM 42B represents the ball direction which will be displayed in the next polling cycle.

In the preceding flow diagrams, the word "display" was used to indicate that data in the display RAM 32 was to be updated. Each time data is to be written into the display RAM 32, it is done under the control of the micro-processor software pursuant to a display routine. The display routine determines whether the character to be displayed is a static character (i.e. one which is incapable of movement such as a calculator symbol) or a dynamic character (e.g. the players, goalies and ball). If a device is a dynamic character, the display routine must cause the current image device to be erased before the new image device is written into the RAM 32. Also, in the case of a dynamic character, the new address must be stored in the RAM 42B.

As indicated above, each static and dynamic symbol which can be displayed on the TV screen is stored as a data block within the ROM 42A of the micro-processor. These display symbols include the various possible rotational positions of each of the players. Each of these display symbols has a device code associated with it and the symbols are addressed by means of the device code. If a device to be stored in RAM 32 is accessed by a device code indicating that the symbol is a static one, the micro-computer jumps to a TV-out subroutine which causes data to be written into RAM 32. The TV-out subroutine gives the starting horizontal and vertical addresses of a data block to be written, the number of bits to be written, and the start command. In writing a data block into the RAM 32, up to eight sequential data bytes are written. The 8-bit word or byte is written into a horizontal line and the vertical address incremented by one after each byte has been written. In the case of the ball, the data block consists of three 3-bit words as described above.

In the case of a dynamic character, the current device is first erased by writing 0's into the data block correponding to the current device position in RAM 32. The new horizontal and vertical addresses (and increment data in the case of the ball) are stored in RAM 42B. The micro-processor then jumps to the TV-out subroutine described above, with the number of bits and numbers of bytes being set to 3 in the case of the ball. Typically, about one milli-second is required to write an 8-byte data block into RAM 32.

FIG. 8 is a detailed block diagram of the logic circuits which comprise the RAM control 72 (FIG. 3). Essentially, the RAM control circuit 72 generates the control signals required to write data into the display RAM 32. In practicing the invention, it may be preferred to write data into RAM 32 during a horizontal or vertical blanking pulse if the slight flicker which occurs when data is written into the RAM by interrupting the readout scan is deemed objectionable. FIG. 8 illustrates a logic circuit intended to permit writing of data only during a blanking period to avoid this possible problem.

When data is to be written into RAM 32, microprocessor 40 produces a command on lines $D_0 - D_3$ of the Input/Output bus which is used to set a four state counter 90 when the counter is enabled by a signal on line 91. The signal on line 91 is derived from the command latch 70 (FIG. 3) when the data on lines $D_0 - D_3$ is to be used to set counter 90.

Counter 90 is responsive to the timing pulses from clock 52 and is capable of counting to fifteen if initially set at zero, in which case the least significant bit will change from "0" to "1" eight times for each sixteen timing pulses. If the counter is intially set to some higher number by lines $D_0 - D_3$, the counter will step through correspondingly fewer stages and the least significant bit can be used to control the number of bits to be written into (or read from) RAM 32.

The least significant bit from the output of counter 90 is coupled to one input of an AND gate 92. The other input of gate 92 is derived from the set output of a flip-flop 94 which receives a RAM write signal from the command latch 70 (FIG. 3).

Flip-flop 94 (and the two other flip-flops shown in FIG. 8) are synchronous devices having set and reset inputs (S and R) for placing the flip-flop in one of its two possible states. The flip-flops, however, can only change state upon the occurrence of a clock pulse on an enabling input C. These clock pulses are also derived from the B clock 52 (FIG. 3).

When a RAM write pulse appears on the set input of flip-flop 94, flip-flop 94 changes state upon occurrence of the next clock pulse B producing a BUSY signal which is coupled to an input of AND gate 92. Counter 90 which is responsive to the B clock pulses, causes its least significant bit to change states on receipt of each clock pulse. Hence, the gate 92 is opened upon receipt of alternate timing pulses (from clock 52) when the BUSY line from flip-flop 94 is high. The output from AND gate 92 is coupled directly to the RAM 32 placing it in a write mode in a known way. Additionally, it is fed to the write gates 74 (FIG. 3) if, as in the illustrated embodiment, writing occurs at a lower speed than reading and it is therefore necessary to switch to a lower speed clock for the writing operation. As mentioned above, the number of pulses from gate 92, and thus the number of bits to be written into RAM 32, depend on the initial count set into counter 90 by lines $D_0-D_3$.

The output pulses from gate 92 can also be used to increment the address latch 66 (FIG. 3) as successive bits are written into RAM 32. This may be achieved by coupling the output of gate 92 to an inverter 93 the output of which will then be high when the least significant bit of counter 90 is low, with the number of pulses dependent on the initial count of counter 90. In effect, the least significant bit of counter 90 will alternately write data and step the address latch on successive timing pulses.

If it is desired to write only during a blank period of the scan, the composite blanking signal generated by the TV sync generator 50 (FIG. 3) is coupled to a NAND gate 98. The output of NAND gate 98 is fed to an enabling input of an AND gate 100 with the busy signal from flip-flop 94 being fed to the second input of AND gate 100 through an OR gate 102. The second input to NAND gate 98 is the set output of a flip-flop 96. Flip-flop 96 is set by a command from the micro-processor when it is desired to write only during the composite blanking period. Hence the output of NAND gate 98 is a series of enabling pulses during each blanking period of the video receiver provided that the appropriate command to write during composite blanking has set flip-flop 96. Accordingly, the output of AND gate 100, which places the addressing multiplexer 64 (FIG. 3) under the control of the microprocessor 40 during the write mode, will be a series of pulses occurring only when the TV screen is blank. Since write-in therefore occurs only during a blank period, the display on the TV receiver will not be interrupted by any flicker although, of course, the need to wait for the blank period will reduce the speed at which the display can be changed.

Normally, data is read from RAM 32 is in the absence of a write signal from the RAM control logic circuit. In some cases, particularly where the invention is being used in a calculator mode, it may be desirable for the micro-processor to read the data which is stored in RAM 32. Accordingly, a third flip-flop 102 is set by a RAM read pulse from the micro-processor indicating that the computer wants to read data which is stored in RAM 32. The set output from the flip-flop 102 is coupled through an OR gate 103 to an enabling input of an AND gate 104. The other input of AND gate 104 is a commond pulse from the micro-processor inquiring as to the read/write status of the RAM which will be represented at the output of the gate 104.

The basic principles of the invention can be readily adapted to different types of games using many of the subroutines described generally above. In a tennis game, for example, the goalies may not be set up, the "goals" may extend across the entire vertical boundaries, and the players may be restricted to half the court. These constraints are set up during the intializing subroutine.

In one version of a moving target game, the player doing the shooting is automaticaly placed in zone 1 or 2 depending on which game control keyboard is used. A ball is attached to and moves with the shooter in the zone and in a vertical direction only. A target is released in the opposite zone when called for by the shooter. The target will either come from the shooter's left or right hand position randomly. It will then travel across to the other side at a random velocity and angle after release. The target will also have the ability to take one random turn during its flight. The shooter must guess and track the target and when ready, the ball attached to the shooter display will be released with the objective being to hit the target. The shooter may move vertically and take up any permitted angle prior to shooting. The release ball will always travel at a uniform constant velocity. If the target is hit, it will "merge" with the ball. If the target is missed, then both the target and shot ball will continue off screen. The next target is then ready for call up.

The invention has been described for use with a black and white television receiver with a single memory bit assigned to each bar of the TV raster. Accordingly, only two states (illuminate and don't illuminate) are possible. If two data storage locations are assigned to each of the bars of the raster, there are four possible conditions for each of the bars and, consequently, gray scale or color selection (in the case of a color receiver) would be possible.

As explained above, the speed factor introduced during the initializing subroutine adjusts the speed of movement of the dynamic image devices by varying the length of the polling cycle. If desired, the keyboard may be provided with a manual accelaration/deceleration ball control key which, when actuated, will increase or decrease the indicated horizontal and vertical ball increments to accelerate or decelerate the ball.

Instead of using individual keys to control the movement of the players and goalies, a joy stick may be used to achieve the same result.

If desired, an audio tone can be generated under the control of the software each time the ball is deflected either from a player, goalie or boundary. For example, the overlay subroutine of the ball deflection routine may generate the audio tone when a deflection is determined. Similarly, an audio tone may be generated when the boundaries are checked during the ball routine and deflection is called for. The audio tone will be coupled to the VHF terminals of the receiver and the sound produced by the audio section of the receiver.

Since the display of the various devices is under the control of the computer software, there are many ways in which the movement of the dynamic image devices can be modified. For example, the speed of the ball may be automatically increased or decreased depending on time or angle of deflection. For tennis games, a bounce factor may be added whereby the ball stops temporarily (or a tone is sounded) with the intention that the returning player must reach the ball prior to the second bounce. A "net" may be used by providing a moving vertical target which will shuttle back and forth along the net. The idea would be to avoid hitting the target which would result in the loss of a point for the hitting player.

An advantage of the invention is that the apparatus purchased can be used to play games other than those for which it was specially designed. This can be done by the use of appropriate programs which have the instructions for new games stored in ROMS which can be added as modular "plug-in" units to the existing device. Thus, as new games are developed, the programs can be purchased by owners of the basic systems to increase its capacity virtually without limit.

What is claimed is:

1. Display control apparatus for use with a television receiver including video signal input terminals, a display tube, and means for scanning said display tube at a predetermined rate, comprising memory means having a multiplicity of discrete digital storage positions, each of said storage positions corresponding to a preselected image area of said display tube, data processor means including storage means for storing therein digital data representing a plurality of prescribed image devices, wherein one of said image devices is a ball intended to move continuously on the display for at least some period of time, and wherein said data processor storage means has stored therein data corresponding to preselected increments of ball movement in horizontal and vertical directions, said increments defining different preselected angular directions for said ball image device and being measured by preselected numbers of said image areas, means for selectively writing digital data into selected ones of said storage positions, said storage positions being selected to correspond to a predetermined image to be displayed on said display tube, means for sequentially reading stored data from said storage positions at said predetermined scanning rate, with each storage position being read essentially as the predetermined image area of the display tube corresponding to that storage position is being scanned, and means responsive to said means for sequentially reading for generating a video signal adapted to be coupled to the video signal input terminals of a television receiver.

2. Display control apparatus according to claim 1, wherein said data processing means includes means for erasing the ball image device stored in said memory means, and means for writing said ball image device in said memory means at a new address dependent on said increments.

3. Display control apparatus according to claim 1, wherein at least one of said image devices is a player movable under the control of a user, and further comprising a control means having first manually actuable means for moving said player image device horizontally and vertically, and wherein said data processing means includes means responsive to said first manually actuable means for erasing the player image device stored in said random access memory, and means for writing said player image device at a new address in said random access memory corresponding to a predetermined new address.

4. Display control apparatus according to claim 3, wherein said data processor means further includes means for comparing the positions of said player and ball image devices and means responsive to said comparing means for modifying said preselected increments to thereby change the direction of movement of said ball image device.

5. Display control apparatus according to claim 3, wherein said control means further includes second manually actuable means for rotating said player image device and wherein there are stored in said first memory a plurality of additional player image devices having different rotational positions and wherein there is further provided means responsive to the actuation of said second manually actuable means for replacing the player image devices stored in said random access memory with a preselected one of said additional player image devices.

6. Display control apparatus according to claim 5, wherein said means for modifying said preselected increments is responsive to the rotational position of said player image device.

7. Display control apparatus according to claim 1, including means for enabling said means for selectively writing only during a horizontal or vertical blanking period during scanning of the television receiver.

8. Display control apparatus according to claim 1, wherein said storage means includes a replaceable memory having stored therein program game instructions whereby different games may be played with said display control apparatus by replacing said replaceable memory.

9. Display control apparatus for use with a television receiver including video signal input terminals, a display tube, and means for scanning said display tube at a predetermined rate, comprising
 a random access memory having a multiplicity of discrete digital storage positions, each of said storage positions corresponding to a preselected image area of said display tube,
 data processor means including storage means for storing a plurality of prescribed image devices, at least one of said image devices comprising a player movable under the control of a user,
 game control means having first manually actuable means for moving said player image device horizontally and vertically,
 means responsive to said game control means and said data processor means for selectively writing one of said preselected image devices into selected ones of said storage positions, said storage positions being selected to correspond to a predetermined image to be displayed on said display tube,
 said data processing means including means responsive to said first manually actuable means for erasing the player image device stored in said random access memory, and means for writing said player image device at a new address in said random access memory corresponding to a predetermined new address,
 means for sequentially reading stored data from said memory positions at said predetermined scanning rate, with each storage position being read essentially as the predetermined image area of the display tube corresponding to that storage position is being scanned, and
 means responsive to said means for sequentially reading for generating a video signal adapted to be coupled to the video signal input terminals of a television receiver.

10. Display control apparatus according to claim 9 wherein, game control means further includes second manually actuable means for rotating said player image device and wherein there are stored in said first memory a plurality of additional player image devices having different rotational positions and wherein there is further provided
 means responsive to the actuation of said second manually actuable means for replacing the player image devices stored in said random access memory with a preselected one of said additional player image devices.

11. Display control apparatus according to claim 9, including means for enabling said means for selectively writing only during a horizontal or vertical blanking period during scanning of the television receiver.

12. Apparatus for playing games by displaying and manipulating player and ball image devices on the screen of a display tube, comprising
 first means for generating a video signal representing a linear player image device aligned in a first direction,
 second means for generating a video signal representing a ball image device,
 manually operable game control means, and
 means responsive to said manually operable game control means for causing said first means to generate a video signal representing the player image device rotated so that it is aligned in a second direction different from said first direction.

13. Apparatus according to claim 12, wherein said means for causing includes programmed microprocessor means and a replaceable memory having program game instructions stored therein for controlling said microprocessor means, whereby different games may be played with said apparatus by replacing said replaceable memory.

14. Apparatus for playing games by displaying and manipulating player and ball image devices on the screen of a display tube, wherein the player image device is manually controlled and the ball image device moves continuously and is deflected from said player image device, the improvement comprising:
 first means for generating a video signal representing a player image device;
 second means for generating a video signal representing a ball image device;
 manually operable game control means for moving said player image device linearly and for rotating said player image device; and
 means responsive to said manually operable game control means for causing said second means to generate a video signal representing the ball image device deflected in one of a plurality of preselected directions.

15. Apparatus according to claim 14, wherein said last-named means is dependent upon the apparent rotational position of said player image device.

16. Apparatus according to claim 15, further including means responsive to said manually operable game control means for causing said first means to generate a video signal representing the player image device lying in a second direction different from said first direction.

17. Apparatus according to claim 14 wherein said last-named means includes programmed microprocessor means and a replaceable memory having program game instructions stored therein for controlling said microprocessor means, whereby different games may be played with said apparatus by replacing said replaceable memory.

* * * * *